US012727610B2

(12) United States Patent
Purl et al.

(10) Patent No.: US 12,727,610 B2
(45) Date of Patent: Sep. 8, 2026

(54) NON-GRAIN COMPOSITIONS COMPRISING THERMALLY INHIBITED AND/OR HEAT MOISTURE TREATED WAXY TAPIOCA

(71) Applicant: Cargill, Incorporated, Wayzata, MN (US)

(72) Inventors: Joseph Purl, Jordan, MN (US); Varatharajan Vamadevan, Plymouth, MN (US)

(73) Assignee: Cargill, Incorporated, Wayzata, MN (US)

( * ) Notice: Subject to any disclaimer, the term of this patent is extended or adjusted under 35 U.S.C. 154(b) by 605 days.

(21) Appl. No.: 17/297,064

(22) PCT Filed: Nov. 15, 2019

(86) PCT No.: PCT/US2019/061635

§ 371 (c)(1), (2) Date: May 26, 2021

(87) PCT Pub. No.: WO2020/112385

PCT Pub. Date: Jun. 4, 2020

(65) Prior Publication Data

US 2021/0401018 A1 Dec. 30, 2021

Related U.S. Application Data

(60) Provisional application No. 62/773,526, filed on Nov. 30, 2018.

(51) Int. Cl.
*A23L 29/212* (2016.01)

(52) U.S. Cl.
CPC .................................. *A23L 29/212* (2016.08)

(58) Field of Classification Search
CPC ..... A23L 29/212; A23L 29/244; C08B 30/14; A23G 9/52; C08L 3/02
USPC .......................................................... 426/578
See application file for complete search history.

(56) References Cited

U.S. PATENT DOCUMENTS 4,038,482 A 7/1977 Eastman
6,221,420 B1 4/2001 Thomas
2001/0017133 A1* 8/2001 Chiu ........................ A23L 7/165 127/29
2003/0108649 A1 6/2003 Jeffcoat
2005/0118325 A1 6/2005 Sips
2014/0287131 A1* 9/2014 Drew ...................... A23L 23/00 426/465
2015/0025158 A1 1/2015 Skorge
2017/0064978 A1* 3/2017 Hanchett ................ A23K 10/26
2018/0249748 A1 9/2018 Sharma

FOREIGN PATENT DOCUMENTS

EP 1241216 A1 * 9/2002 ............. A23L 23/00
EP 1314742 A1 5/2003
WO 9603892 W 2/1996
WO 2018069535 A1 4/2018
WO WO-2018112383 A1 * 6/2018 ............. A23K 10/30
WO 2018172398 A1 9/2018
WO 2019055381 3/2019
WO 2019089656 A1 5/2019

OTHER PUBLICATIONS

NPL Brookfield Viscometer DV-II (year 1985 as documented by Google Search). (Year: 1985).*
Google search for Brookfield DVII—Pro Viscometer (Retrieved on Apr. 20, 2024). (Year: 2024).*
NPL Flour and Starch (Retrieved on Apr. 4, 2025). (Year: 2025).*

* cited by examiner

*Primary Examiner* — Erik Kashnikow
*Assistant Examiner* — Bhaskar Mukhopadhyay

(57) ABSTRACT

Described herein is non-grain composition, comprising at least a thermally inhibited or HMT waxy tapioca starch having a post-retort viscosity of less than 1500 centipoise. Such composition can be used for retort food applications; shelf-stable, thermally processed food applications; canned food applications; and/or aseptic packing and ultra-heat treated process food applications.

19 Claims, 2 Drawing Sheets

NON-GRAIN COMPOSITIONS COMPRISING THERMALLY INHIBITED AND/OR HEAT MOISTURE TREATED WAXY TAPIOCA

This application claims the benefit of U.S. Provisional Application No. 62/773,526, filed Nov. 30, 2018, entitled NON-GRAIN COMPOSITIONS COMPRISING THERMALLY INHIBITED AND/OR HEAT AND MOISTURE TREATED WAXY TAPIOCA, which is hereby incorporated by reference in its entirety.

TECHNICAL FIELD

This application relates to non-grain compositions comprising thermally inhibited or heat moisture treated waxy tapioca and methods of manufacturing the same.

BACKGROUND

Consumers are asking for label friendly starches in food and beverage applications. While there is a desire to create label-friendly starches, there is also a desire for such starches to have desirable performance and functionality characteristics. Clean label starches having "thick-thin" and "thin-thick" viscosifying properties are also useful for food products need to be retorted. Furthermore, certain food applications, for example wet pet food applications, prefer starches derived from non-grain sources.

SUMMARY

Described herein is non-grain composition, comprising at least a thermally inhibited or HMT waxy tapioca starch having a post-retort viscosity of less than 1500 centipoise. Such composition can be used for retort food applications; shelf-stable, thermally processed food applications; canned food applications; and/or aseptic packing and ultra-heat treated process food applications.

FIGURES

Figure 1:
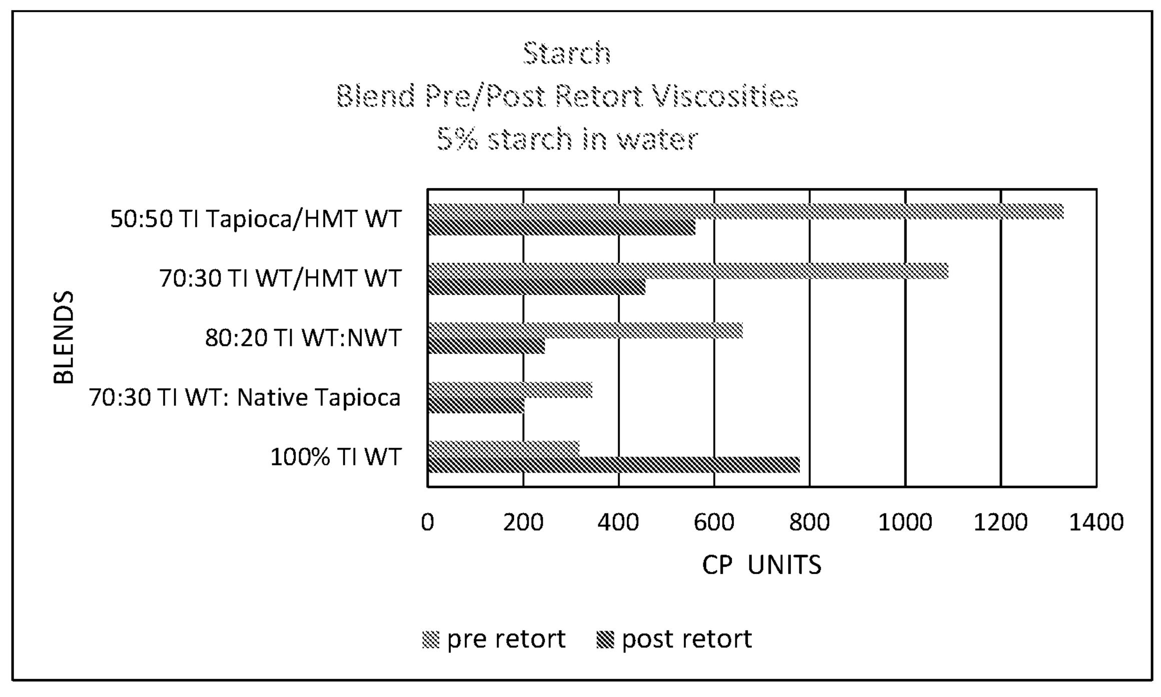

FIG. 1 provides pre and post retort data for the non-grain compositions comprising thermally inhibited waxy tapioca described herein.

Figure 2:
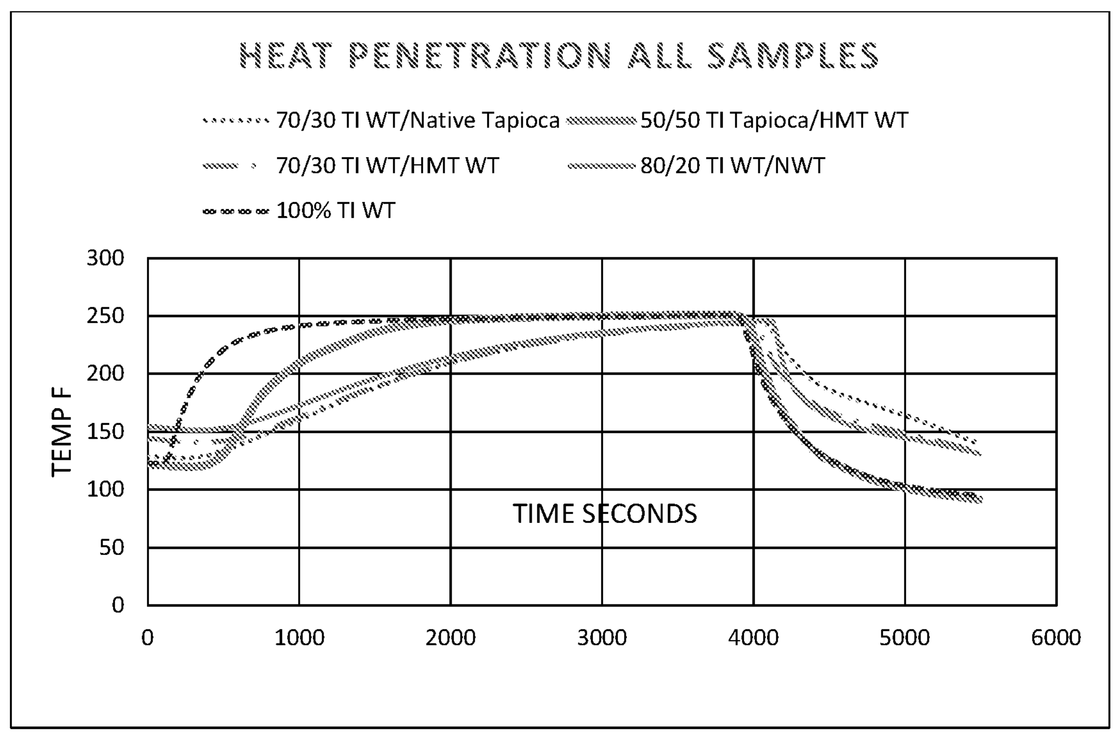

FIG. 2 provides heat penetration data for the non-grain compositions comprising thermally inhibited waxy tapioca described herein.

DETAILED DESCRIPTION

Described herein is a label friendly, physically modified starch composition that can withstand retort applications. It shall be understood that the term "retort" is collectively meant to include retort applications, acid shelf stable applications, and refrigerator stable applications. The starch composition described herein is a non-grain composition which means the composition does not comprise any grain sources. "Grain" is defined as caryopses of cereals and single seed fruit of grasses are known as caryopses. The starch compositions described here are derived from non-grain sources. The non-grain composition can be a starch composition and in other aspects can be a flour composition wherein they are derived from native waxy tapioca. In other aspects, starch or flour composition derived from native tapioca, potato, waxy potato or highly phosphorylated (>900 ppm) potato or highly phosphorylated (>900 ppm) waxy potato or SSIII mutant potato or SSIII mutant waxy potato or SSIII and BE1 double mutant potato or SSIII, BE1 mutant waxy potato or short chain amylopectin waxy potato mutant (lack of or non-functional GBSS1 combine with deficient or non-functional SSII and/or SSIII enzymes) or arrow root powder. In preferred aspects, the non-grain composition is a starch composition.

The starch composition described herein comprises at least a thermally inhibited ("TI") or heat moisture treated ("HMT") waxy tapioca starch. Note that the term "tapioca" may also be referred to as cassava, yucca, manioc, mandioca, or Brazilian arrowroot.

Such TI waxy tapioca and HMT waxy tapioca starch (also referenced herein as just "TI waxy tapioca" and "HMT waxy tapioca") are made starting with native waxy tapioca starch. Such native waxy tapioca starch is extracted from waxy tapioca root through milling processes commonly known by those skilled in the art. A native waxy tapioca starch and water slurry is first prepared. The native waxy tapioca starch comprises about 35-30 wt % of the slurry. The pH of the slurry is adjusted to about 8.5 to 10.5 using any alkaline source for example sodium carbonate. The slurry is then dewatered to extract the pH adjusted tapioca and dried to 5-10% moisture content. Starch is then dehydrated for a time and at a temperature at 100C-120 C sufficient to render the starch anhydrous or substantially anhydrous. Anhydrous or substantially anhydrous pH adjusted alkaline tapioca is heat treated to a temperature ranging from 145C-170C to for a period of time ranging from about 0.5 to about 10 hours to achiever thermal inhibition. Thermal inhibition is a physical modification process viewed more favorably amongst consumers as an alternative to chemical modification. It shall be understood that various technologies can be used to achieve thermal inhibition, for example but not limited to fluidized bed reactor, paddle mixer reactor, vibrating spiral conveyor, microwave, and radiofrequency technologies.

HMT waxy tapioca is made by obtaining native waxy tapioca starch and adjusting its moisture content to a range of about 18 wt % to 25 wt %. The moisture adjusted waxy tapioca is heated to a temperature ranging from 110C-130C for about 0.5 to about 16 hours to obtain HMT waxy tapioca. It shall be understood that various moisture and heat treatments can be used to achieve heat and/or moisture treatment and the aspect described herein in just one aspect. Typically, HMT processes take place at temperatures ranging from 40C-150C and result in a moisture content ranging from 10 wt % to 75 wt %.

The starch composition can further comprise other tapioca starch sources. For example, the starch composition can be a blend of TI and HMT waxy tapioca. In other examples, the TI or HMT waxy tapioca can be blended with native waxy tapioca, or native tapioca. In starch compositions wherein additional tapioca sources are included, TI or HMT waxy tapioca makes up at least 50% of total tapioca sources, in preferred aspects at least 60% of total tapioca sources, in more preferred aspects at least 70% of total tapioca sources, and in more preferred aspects at least 80% total tapioca sources.

The starch composition can further comprise flour, non-tapioca, and/or non-starch tapioca sources. For example, tapioca flour, gums (e.g., xanthan gum), plant-derived fibers, for example legume fibers (e.g., pea, lentil, bean) or vegetable fibers or pectin (e.g., tuber or root) or fruit fibers, or pectin (e.g., fruit pectin), methyl cellulose, hydroxypropylated methyl cellulose, hydrolyzed flour, soluble flour, instant starches, pregelatinized starch, or TI treated instant starches, beta amylase and/or alpha amylase treated starches or flour. In these starch compositions, TI or HMT waxy tapioca makes up at least 50% of the blend, in other aspects at least 60% of the blend, in other aspects at least 70% of the blend, in other aspects at least 80% of the blend, and in other aspects at least 90% of the blend.

The starch composition or starch blends can further comprise a salt component (e.g., salt, salt source, or salt ion), wherein the salt makes up about 0.1-5 wt % of the slurry. Salts can include but are not limited to sodium chloride, potassium chloride, calcium chloride, calcium rich fibers (e.g., millet), nixtamalized starch or flour (starch or flour treated with calcium source), starch or flour annealed (HMT) with calcium salts, calcium oxide, or mixtures thereof.

The starch composition described herein demonstrates slow freeze thaw stability and can survive at least one slow freeze thaw cycle demonstrating no syneresis. An aspect of such slow freeze thaw method is described in U.S. Patent Publication US2017/0064978. Surprisingly, the starch compositions described herein work well in retort applications as they withstand retort processes and maintain viscosity through pre and post retort. Notably, at least 30% of viscosity remains from pre-retort to post-retort, and in preferred aspects at least 40% of viscosity remains from pre-retort to post-retort, and in more preferred aspects at least 50% of viscosity remains from pre-retort to post-retort.

The starch composition described herein typically has a post-retort viscosity of less than 1500 centipoise, less than 1400 centipoise, less than 1300 centipoise, less than 1200 centipoise, less than 1100 centipoise, less than 1000 centipoise, less than 900 centipoise, less than 800 centipoise, less than 700 centipoise, less than 600 centipoise, less than 500 centipoise, less than 400 centipoise, less than 300 centipoise, or less than 200 centipoise.

The starch composition is desirable for retort food applications. For example but not limited to, shelf-stable, thermally processed food applications, canned food applications, and pet food applications.

EXAMPLES

Example 1: Retort Process and Results for Composition Comprising Thermally Inhibited Waxy Tapioca The starch composition (indicated by the combinations in Table 1) is made into a slurry, wherein the starch composition makes up 5% of the slurry and water makes up the remaining portion.

TABLE 1

| Starch Composition |
|---|
| 100% TI Waxy Tapioca ("TI WT") |
| 70% TI Waxy Tapioca, 30% HMT Waxy Tapioca ("HMT WT") |
| 80% TI Waxy Tapioca, 20% Native Waxy Tapioca ("NWT") |
| 70% TI Waxy Tapioca, 30% Native Tapioca (CreamTex ® 70001) |
| 50% TI Tapioca, 50% HMT Waxy Tapioca |
| 70% TI Waxy Tapioca, 30% Tapioca Flour |
| 90% TI Waxy Tapioca, 10% Xanthan Gum |
| 90% TI Waxy Tapioca, 10% Pea Fiber |
| 85% TI Waxy Tapioca, 15% Citrus Fiber |
| 60% TI Waxy Tapioca, 10% Xanthan Gum |
| 60% TI Waxy Tapioca, 40% TI Tapioca |

Heat slurry to 170F in a Vorwerk on 3.5 and hold for 5 minutes at 170F. Measure initial viscosity at 165F using a Brookfield Viscometer (Model: Brookfield DV-II+Pro; Spindle: RV spindle #6; Pre-retort: 50 rpm/165F; Post-retort: 50 rpm/165F). Fill 300×407 cans with 12/32's head-space and seam cans. Retort for 60 minutes at 250F (Static) then cool to below 100F. Collect heat penetration data (illustrated in FIG. 2). Allow cans to equilibrate overnight and heat to 170F in water bath unopened. Measure post retort viscosity at 165F. Tables 2, 3, 4, and 5 provide raw data for pre and post retort. FIG. 1 also demonstrates pre-retort and post-retort data. As illustrated, the post-retort viscosity is at least 30% of the pre-retort viscosity. Furthermore, all starch compositions survive at least one freeze-thaw cycle.

TABLE 2

| Sample-pre retort | usage level | Spindle | RPM | cp | % | Temp F. |
|---|---|---|---|---|---|---|
| 100% TI WT | 5% | 5 | 50 | 297.7 | 39.7 | 165 |
| TI WT-70%/Native Tapioca-30% | 5% | 6 | 50 | 343.6 | 17.8 | 165 |
| TI WT - 80%/NWT - 20% | 5% | 6 | 50 | 659.3 | 35.3 | 165 |
| TI WT - 70%/HMT - 30% WT | 5% | 6 | 50 | 1089 | 58.2 | 165 |
| TI Tapioca-50%/HMT WT - 50% | 5% | 6 | 50 | 1331 | 72 | 165 |

TABLE 3

| Sample post retort | usage level | Spindle | RPM | cp | % | Temp F. |
|---|---|---|---|---|---|---|
| 100% TI WT | 5% | 5 | 50 | 156.7 | 20.9 | 165 |
| TI WT-70%/Native Tapioca-30% | 5% | 6 | 50 | 202.5 | 10.8 | 165 |
| TI WT - 80%/NWT - 20% | 5% | 6 | 50 | 245.6 | 13.1 | 165 |
| TI WT - 70%/HMT - 30% WT | 5% | 6 | 50 | 455.5 | 24.4 | 165 |
| TI Tapioca - 50%/HMT WT - 50% | 5% | 6 | 50 | 560 | 28 | 165 |

TABLE 4

| Sample-pre retort | usage level | Spindle | RPM | cp | % | Temp F. |
|---|---|---|---|---|---|---|
| TI WT- 100 | 5.0% | 5 | 50 | 317.2 | 42.2 | 165 |
| TI WT + Tapioca flour- 70:30 | 5.0% | 5 | 50 | 500.1 | 66.6 | 165 |
| TI WT + Xanthan gum- 90:10 | 5.0% | N/A | 50 | N/A | N/A | 165 |
| TI WT + Pea fiber- 90:10 | 5.0% | 5 | 50 | 205.5 | 27 | 165 |
| TI WT + Citrus fiber- 85:15 | 5.0% | 5 | 50 | 374.7 | 51.8 | 165 |
| TI WT + 99605-60:40 | 5.0% | 5 | 50 | 356.8 | 47 | 165 |

TABLE 5

| Sample-post retort | usage level | Spindle | RPM | cp | % | Temp F. |
|---|---|---|---|---|---|---|
| TI WT- 100 | 5.0% | 6 | 50 | 778 | 41.5 | 165 |
| TI WT + Tapioca flour- 70:30 | 5.0% | 6 | 50 | 673 | 36 | 165 |
| TI WT + Xanthan gum- 90:10 | 5.0% | 6 | 50 | 1413 | 75.2 | 165 |
| TI WT + Pea fiber- 90:10 | 5.0% | 6 | 50 | 892 | 47 | 165 |
| TI WT + Citrus fiber- 85:15 | 5.0% | 6 | 50 | 982 | 52.3 | 165 |
| TI WT + 99605-60:40 | 5.0% | 5 | 50 | 420.7 | 56 | 165 |

The invention claimed is:

1. A non-grain starch composition, comprising at least a thermally inhibited or heat moisture treated (HMT) waxy tapioca starch made starting with a native waxy tapioca starch, wherein the non-grain starch composition has a post-retort viscosity of less than 1500 centipoise, wherein the post-retort viscosity is at least 30% of the pre-retort viscosity and the composition survives at least one slow freeze thaw cycle while demonstrating no syneresis when retorted for about 60 minutes at a retort temperature of about 250° F., wherein the pre-retort viscosity and the post-retort viscosity are measured using a Brookfield Viscometer (Model: Brookfield DV-II+Pro: Spindle: RV spindle #6: 50 rpm/165F), and wherein the starch composition does not comprise starch from grain sources.

2. The non-grain starch composition of claim 1, wherein the post-retort viscosity is less than 1000 centipoise.

3. The non-grain starch composition of claim 1, wherein the post-retort viscosity is less than 500 centipoise.

4. The non-grain starch composition of claim 1, wherein the post-retort viscosity is less than 400 centipoise.

5. The non-grain starch composition of claim 1, wherein the post-retort viscosity is less than 300 centipoise.

6. The non-grain starch composition of claim 1, wherein the post-retort viscosity is less than 200 centipoise.

7. The non-grain starch composition of claim 1, comprising thermally inhibited waxy tapioca starch and HMT waxy tapioca starch.

8. The non-grain starch composition of claim 1, further comprising native tapioca starch.

9. The non-grain starch composition of claim 8, wherein the thermally inhibited or HMT waxy tapioca starch is at least 50% of total tapioca starch.

10. The non-grain starch composition of claim 1, further comprising, gums, plant-derived fiber, pectin, methyl cellulose, hydroxypropylated methyl cellulose, instant starches, pregelatinized starch, beta amylase and/or alpha amylase treated starch or TI treated instant starches.

11. The non-grain starch composition of claim 1, further comprising a salt component.

12. The non-grain starch composition of claim 1 capable of surviving a retort process.

13. The non-grain starch composition of claim 1, wherein the post-retort viscosity is at least 40% of the pre-retort viscosity.

14. A retort food application comprising the composition of claim 1.

15. A shelf stable, thermally processed food application comprising the composition of claim 1.

16. A canned food application comprising the composition of claim 1.

17. Aseptic packing and ultra-heat treated process food application comprising the composition of claim 1.

18. A pet food application comprising the composition of claim 1.

19. A non-grain starch composition, comprising at least a thermally inhibited or HMT waxy tapioca starch having a post-retort viscosity of less than 1500 centipoise, wherein the post-retort viscosity is at least 30% of the pre-retort viscosity at a retort temperature of 250° F. for about 60 minutes, wherein the starch composition does not comprise starch from grain sources.

* * * * *